JOINING GLASS MEMBERS AND ENCAPSULATION
OF SMALL ELECTRICAL COMPONENTS

Filed Nov. 30, 1962

INVENTOR.
BERNARD L. STEIERMAN
BY
W. A. Schaich, E. J. Holler
ATTORNEYS

United States Patent Office 3,217,088

Patented Nov. 9, 1965

3,217,088

JOINING GLASS MEMBERS AND ENCAPSULATION OF SMALL ELECTRICAL COMPONENTS

Bernard L. Steierman, Toledo, Ohio, assignor to Owens-Illinois Glass Company, a corporation of Ohio Filed Nov. 30, 1962, Ser. No. 241,401

8 Claims. (Cl. 174—52)

Figure 1:
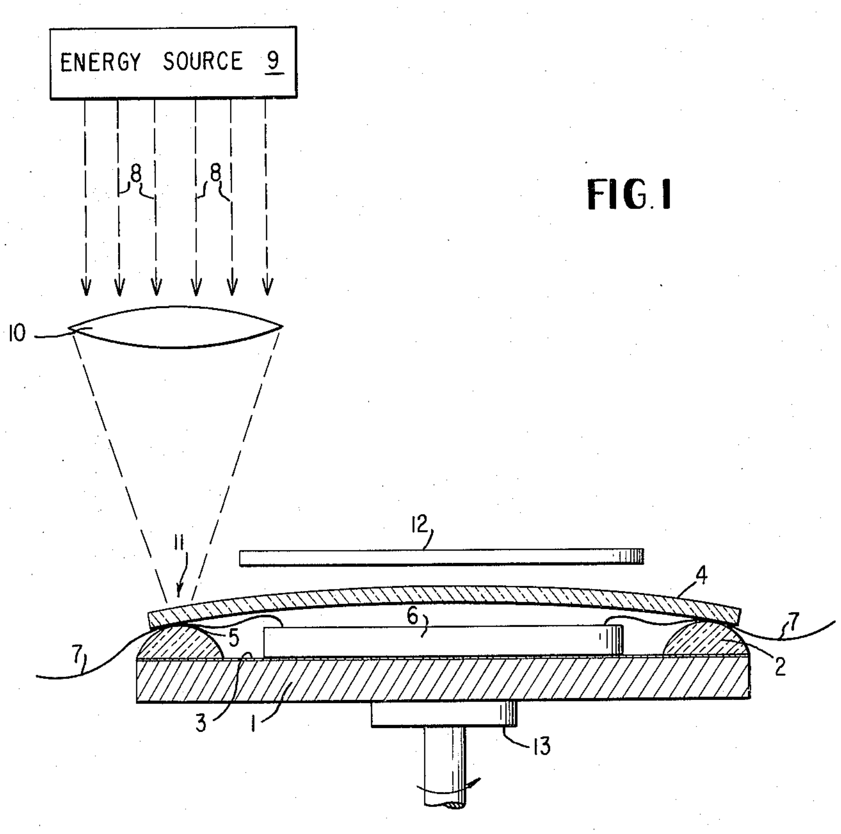

This invention relates to encapsulation of small electrical components and, more particularly, to enclosures for microelectronic circuit elements and a method for making the same.

In the encapsulation of miniaturized electronic components, such as semi-conductor elements used in microcircuitry, it is frequently necessary that the enclosures for the components have characteristics typical of a hermetic seal. However, in achieving such characteristics, e.g., providing a hermetically sealed enclosure, it is necessary that the seal be made without unduly raising the temperature of the sealed electronic component. Also, it is obviously desirable that the enclosure be made up of relatively few parts, and that it can be made in a relatively short time.

It is therefore an object of the present invention to provide new and improved enclosures for small electrical components.

It is another object of the present invention to provide such enclosures which are hermetically sealed.

It is a further object of the present invention to provide a new and improved method for making enclosures for small electrical components.

It is still another object of the present invention to provide such a method wherein the electrical component is hermetically sealed, and the hermetic seal is accomplished without unduly raising the temperature of the sealed component.

Briefly described, a preferred enclosure according to the present invention comprises a base plate having adjacent its periphery an upwardly extending rim of relatively low-melting glass, and a glass top member or cover which is joined to the low-melting glass rim. The small electrical component is sandwiched between the glass cover and the base plate, and the electrical leads of the component extend outwardly beyond the low-melting glass rim which joins the glass cover to the base plate.

A preferred method for making the enclosure just described is to form an endless rim of relatively low-melting, and preferably infra-red, opaque glass on a glazed metal plate, or a plate of inorganic insulating material. The small electrical component, having conducting leads extending therefrom, is placed within the confines of the endless rim with the leads extending outwardly beyond the rim. A thin film or foil of glass of desired composition is then placed over the rim and rested on the crest thereof.

A high intensity radiant energy source, such as a maser or laser, is positioned to direct a beam of such energy toward the thin glass film or foil and, by means of a suitable optical device such as a lens, focus the beam onto a localized area which has a lateral dimension comparable in width to that of the endless rim of low-melting glass. The beam is focused and directed to the overlap region between the glass film or foil and the rim of low-melting glass for such time as is necessary to melt the low-melting glass and cause it to adhere to the glass foil cover. A shield, preferably reflective, prevents the high intensity energy from reaching the electrical component which is sandwiched between the glass film or foil cover and the base plate. The hermetic seal may be formed simultaneously along the entire endless low-melting glass rim, or the seal can be made by moving the rim through the focal point of the optical device.

Figure 2:
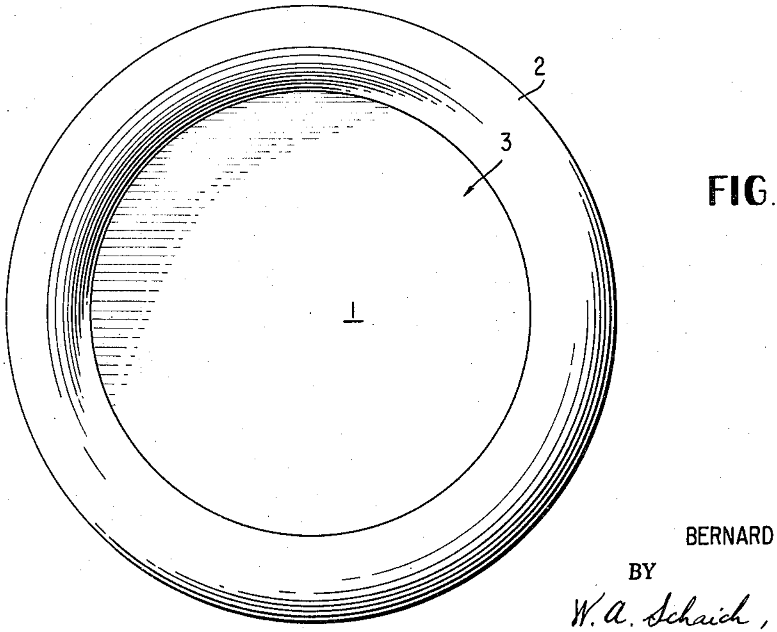

Other objects and advantages of this invention will become more apparent from the following detailed description taken in conjunction with the accompanying drawing in which:

FIG. 1 is an enlarged side view, partly in vertical cross-section, showing an enclosure according to the present invention, and also showing application of radiant energy to seal the enclosure; and FIG. 2 is an enlarged plan view of a portion of the enclosure shown in FIG. 1.

Referring to the drawing, an enclosure according to the present invention includes a metal base plate 1 which has an endless glass rim or rib 2 formed on the glaze coating 3 of the base plate, and a transparent film or foil of glass 4 which is joined to the crest portion 5 of glass rim 2 throughout the circumferential extent of the crest portion. The joint between cover member 4 and endless glass rim 2 is preferably formed by fusing the cover member to the crest portion 5 of the glass rim in a manner described hereinafter.

An electrical component 6, which may be a miniaturized semi-conductor element, is located within the recess defined by endless rim 2, as shown in FIG. 1, and may be secured onto the upper surface of glaze coating 3 by any suitable means, such as an adhesive. Component 6 has electrical leads 7 which extend outwardly of the enclosure, passing through the joint formed where the lower surface of cover member 4 is fused to the crest portion 5 of endless rim 2 as shown in FIG. 1. Leads 7 are therefore held in spaced, insulated relation with respect to each other. Also, since the endless glass rim 2 is bonded onto the upper surface of base plate 1 and to the adjacent under surface of cover member 4, electrical component 6 is hermetically sealed within the hollow space defined by the cover member, rim, and base plate.

In making an enclosure as described above, a preferred procedure according to the present invention is to first form an endless rim or rib 2 of an infra-red opaque low-melt glass onto the upper surface of glaze coating 3 of base plate 1. The electrical component 6 is then placed within the recess defined by glass rim 2, and the component leads 7 are extended so that they overlie the crest portion 5 of the glass rim and extend outwardly beyond the periphery of the base plate. Cover member 4, which has a peripheral outline corresponding substantially to that of base plate 1, is then placed over the base plate and endless rim 2 so that the outer periphery of the cover member is adjacent to the outer periphery of the base plate and glass rim, as shown in FIG. 1.

A beam, indicated by arrows 8, of high intensity, visible and infra-red radiant energy is then directed from a radiant energy source 9 through a suitable optical device, such as lens 10, and focused on the upper surface of thin glass film or foil cover member 4 which lies above endless glass rim 2. The focus of the radiant energy is such that it is directed onto a localized area 11 of the upper surface of cover member 4 which has an annular width comparable to the annular width of endless glass rim 2. Application of the high intensity radiant energy is continued for such time as is necessary to melt the low-melting glass which constitutes endless rim 2, and in order that the crest portion 5 of the rim is fused to the adjacent under surface of glass film or foil cover member 4. During application of the radiant energy, a heat shield 12, which is preferably highly reflective, is maintained in position (as indicated in FIG. 1) so that none of the radiant energy from source 9 is directed onto electrical component 6 thereby preventing the component from becoming unduly overheated.

Source of high intensity radiant energy 9 is preferably an optical maser whereby the beam 8 can be controlled by optical means to produce the required beam shape and characteristics. Thus, the beam may be focused on endless rim or rib 2 throughout its circumferential extent or, alternatively, the rim may be moved through the focal area of beam 8 as indicated in FIG. 1. Thus, where the endless rim is annular, base plate 1 may be supported on a platform member 13 and rotated thereby at a speed governed by the time required to melt endless rim 2 to cause the cover member 4 to fuse to the crest portion 5 of the rim. Where the beam shape is controlled so that the beam is applied to localized area 11 throughout the entire annular extent of this localized area then the crest portion 5 of endless rim 2 is melted throughout its entire circumferential extent at the same time to produce the desired bonding or fusing between the cover member 4 and the rim crest portion.

Base plate 1 may consist of a metal plate having a glaze coating 3 thereon, or the base plate may be made entirely of inorganic insulating material. Also, while the peripheral configuration of the enclosure is shown as being circular in the drawing, it will be appreciated that the enclosure may be noncircular in peripheral configuration, it simply being necessary to adapt the application of the high intensity radiant energy to the particular peripheral configuration involved to achieve the necessary melting or softening of the crest portion of the rim to provide the desired seal. The latter, of course, also holds the electrical leads 7 in spaced insulated relation with respect to each other.

Accordingly, while I have described and illustrated a preferred embodiment of my invention, I wish it to be understood that I do not intend to be restricted solely thereto, but I do intend to cover all modifications thereof which would be apparent to one skilled in the art and which come within the spirit and scope of my invention.

I claim:

1. A hermetically sealed enclosure comprising a base plate, an endless rim of low-melting glass, said low-melting glass being opaque to infra-red radiation and formed on one surface of said plate, and a thin foil cover member sealingly joined to the crest of said endless rim, said cover member being transparent to high intensity radiation at least in the area where it is joined to said crest.

2. A hermetically sealed enclosure comprising a metal base plate member, an endless rim of low-melting solder glass on one surface of said metal plate, a thin glass foil cover member sealingly fused to the crest of said endless rim of glass throughout the length of said crest, said thin foil cover member being transparent to high intensity radiation at least at the area where it is joined to said crest.

3. A hermetically sealed enclosure according to claim 1 wherein said base plate is a metal member and further including an electrical component located between said cover member and on said base plate, said component having one or more electrical leads extending outwardly beyond said rim.

4. The method of making a hermetically sealed enclosure comprising fusing an endless rim of low-melting solder glass onto a base plate, placing an electrical component on said base plate, said component having leads extending outwardly beyond the crest of said endless rim of solder glass, placing a glass cover member over and in contact with the crest of said endless rim, and applying a beam of high intensity radiant energy to the area of said cover member which overlaps said endless rim and through said cover member to melt said rim and cause said cover member to become fused to the crest portion of said rim.

5. The method according to claim 4 which includes shielding said cover member from said radiant energy within the area of said cover member which does not overlap said endless rim to protect said electrical component.

6. The method of making a hermetically sealed enclosure for a small electrical component having one or more electrical leads extending therefrom, said method comprising the steps of forming an endless rim of low-melting glass onto a base plate, placing said electrical component onto said base plate and within the area thereof bounded by said rim, extending the electrical leads of said component beyond said rim and over the crest thereof, placing a cover member over said component and in contact with said rim crest so that the electrical leads of said component lie between said cover member and said rim crest, said cover member being transparent to radiant energy at least in the area where said cover member overlies said endless rim, and then applying a beam of high intensity radiant energy to the area of said cover member which overlies said rim crest for a time sufficient to melt said rim and cause said cover member to become sealed to said rim.

7. The method according to claim 6 wherein said high intensity radiant energy is applied simultaneously throughout the entire area of said cover member which overlies said endless rim.

8. The method according to claim 6 wherein said high intensity radiant energy is applied to said cover member at a localized area of said cover member which overlies said glass rim, and said rim and cover member are moved together so that said localized area progresses throughout the entire endless length of said rim, the rate of movement being predetermined to permit said rim to melt and fuse to said cover member progressively as said movement occurs.

References Cited by the Examiner

UNITED STATES PATENTS

| | | | |
|---|---|---|---|
| 2,014,781 | 9/35 | Rothe et al. | 174—50.58 X |
| 2,125,316 | 8/38 | Ronci | 156—272 X |
| 2,553,259 | 5/51 | Hagedorn | 156—272 X |
| 2,697,311 | 12/54 | Polan | 65—57 X |
| 2,999,964 | 7/60 | Glickman | 317—234 |
| 3,059,158 | 2/59 | Doucette et al. | 317—234 |
| 3,096,767 | 7/63 | Gresser et al. | 88—1 |

FOREIGN PATENTS 611,474 10/60 Italy.

OTHER REFERENCES

"Preview of National Electronics Conference," by Cletus M. Wiley, "Electronics," October 5, 1962.

JOHN F. BURNS, *Primary Examiner.*

JOHN P. WILDMAN, E. JAMES SAX, *Examiners.*